Patented May 11, 1943

2,318,845

UNITED STATES PATENT OFFICE 2,318,845

DENTAL RESIN

Roy C. Feagin, Flushing, N. Y., and Charles H. Prange, Short Hills, N. J., assignors to Austenal Laboratories, Inc., New York, N. Y., a corporation of New York No Drawing. Application March 23, 1940, Serial No. 325,610

5 Claims. (Cl. 260—42)

Our invention relates generally to denture material, and it has particular relation to modified ethyl alpha methacrylate resins for making improved dentures.

In the last few years a number of denture materials have been developed with the view of improving on the widely used rubber compositions. Among the most prominent of these synthetic resinous materials has been polymeric methyl alpha methacrylate. This material is available for dentures in plastic blanks, rigid polymeric blanks, and as polymer granules and liquid monomer combinations. However, the methyl alpha methacrylate materials have been found to have a number of defects. The most noticeable and important of these defects are excessive shrinkage, little adhesiveness to porcelain teeth, considerable checking of teeth, a tendency for dentures to contain bubbles or voids, and difficulty in finishing.

The object of our invention, generally stated, is to provide a denture material having the tinting and tasteless properties of methyl alpha methacrylate dentures, but with improved physical properties in respect to shrinkage, adhesiveness, freedom from checking of teeth, freedom from bubbles and voids, and ease in finishing.

An important object of our invention is to provide an improved denture material which may be processed and molded at relatively low temperatures and pressures.

Another object of our invention is to provide an improved denture material which has low water "sorption," to prevent retention of odors and tastes.

Still another object of our invention is to provide a denture having improved form stability over long periods of use and after repairs.

Other objects of our invention will, in part, be obvious and in part appear hereinafter.

For a more complete understanding of the nature and scope of our invention, reference may now be had to the following detailed description disclosing illustrative compositions, methods of production, and technique of use, and the scope of which is indicated by the appended claims.

In so far as we are aware, polymeric ethyl alpha methacrylate has never been used as a denture material. It has a low specific gravity and high tensile and impact strength. It is colorless, tasteless, odorless, unaffected by the human saliva, and hard and very tough. However, in spite of all of the above desirable properties of ethyl alpha methacrylate, it distorts somewhat in water at the higher temperatures encountered in the mouth. A test bar $\frac{1}{8}'' \times \frac{1}{2}'' \times 2\frac{1}{2}''$, molded from polymeric material was found to distort considerably in water at 125° F. in several hours. This temperature is approximately that of hot liquids taken into the mouth. Also, upon attempting to repair a denture formed solely of polymeric ethyl alpha methacrylate, it was found that the repair section would not bond securely to the denture. Consequently, it would be necessary to resort to mechanical expedients, such as undercuts or dove-tailed openings in making repairs. Both the distortion and insufficient adhesion in repairs are of course objectionable features in dentures.

We have found that by mixing polymeric ethyl alpha methacrylate with certain liquids, capable of polymerization, either monomeric or partially polymerized, and then polymerizing the resulting mixture by known means, a very satisfactory and desirable denture material is obtained. Test bars of this material do not distort in water at 125° F. They are strong, tough, hard, unaffected by human saliva, and have low water "sorption."

Catalysts, such as benzoyl peroxide, may be incorporated into the powder or the liquid or into the mixture to promote polymerization, preferably at an elevated temperature. Tinting pigments, and dyes, and fillers and small amounts of plasticizers may be incorporated into the mixture as desired. The dyes, pigments, fillers, plasticizers, and catalysts may be introduced separately or as mixtures thereof. The polymerization may take place by heating in water, oil, a vulcanizer, or at dry heat, preferably at a temperature between room temperature and about 320° F.

One preferred combination of materials is given as follows:

To 16 cc. of 40–100 mesh polymeric ethyl alpha methacrylate, (either as precipitated from a suspension or an emulsion, or comminuted to size) suitably tinted, is added a liquid of approximately the following composition:

| | c. c. |
|---|---|
| Monomeric ethyl alpha methacrylate | 1 |
| Diallyl itaconate | 1 |
| Styrene | 2 |

The following technique has been found satisfactory for making a denture using the above materials: Four parts by volume of the polymeric ethyl alpha methacrylate powder are added to a beaker or porcelain jar, and then one part by volume of the liquid is added to the powder. For example, 28 cc. of powder and 7 cc. of the liquid may be used. The powder and liquid are immediately mixed well with a stirring rod or spatula until the mass becomes slightly stringy. This mixing requires about one minute and should preferably not be continued beyond this stage. The mass is then packed well into a warm, but not hot, carefully foiled flask, which may be over packed slightly as the material flows easily. The flask is then pressed between moist or oiled cellophane for about one minute to partially close the flask. The flask is then separated to remove the excess material around the periphery and then reclosed. The entire operation of mixing, packing and closing the flask should take about five minutes. The closed flask is now placed into a vulcanizer in a spring press and heated to about 265° F. About 20 to 30 minutes are allowed for the vulcanizer to reach this temperature. The material is cured for about one hour at 265° F. The flask is then removed from the vulcanizer and bench cooled for 15 minutes and then cooled in water to room temperature. It should be made sure that the flask is at room temperature before the denture is removed from it. The denture may then be finished and polished in the usual manner, using a wet buff.

The above technique is somewhat altered in respect to heating and curing when a polymerization catalyst is incorporated in the material. Thus benzoyl peroxide may be incorporated into the material, usually by dissolving it in the liquid. Usually about 1% of catalyst is used, based on the weight of the liquid. When a catalyst is incorporated in the material, the closed flask is placed in warm water in a press and the water is heated to boiling. About 20 to 30 minutes may be allowed for the water to reach its boiling temperature. The material is cured for about one and a half hours in the water at boiling temperature. The flask is then removed, allowed to bench cool for 15 minutes, and then cooled in water to room temperature.

The added liquid forms a very complicated copolymer on polymerization in intimate admixture with the polymeric ethyl alpha methacrylate in the resulting denture material. It is believed that some degree of interpolymerization takes place between the polymeric ethyl alpha methacrylate and the copolymer, or interpolymer formed from the liquid. The monomeric ethyl alpha methacrylate seems to insure the compatibility, over long periods of time, of the polymeric ethyl alpha methacrylate with the other constituents, not only because there is the same structure in portions of the copolymer formed from the liquid, but also because of the possibility of its interpolymerization with the copolymer. The diallyl itaconate promotes the formation of insoluble infusible resins upon polymerization. The adhesiveness of the resulting denture material appears to be due to the combination of the styrene and the diallyl itaconate portions of the copolymer.

The styrene portion of the copolymer seems to aid in producing a strong product having very low water sorption. There is very little shrinkage upon polymerization of the liquid due to this constituent.

The liquid (comprising monomeric ethyl alpha methacrylate, diallyl itaconate, and styrene) which is added to the polymeric ethyl alpha methacrylate exerts a pronounced solvent action thereon. This liquid seems to soften, dissolve and plasticize the polymeric ethyl alpha methacrylate even in a very small amount of time. This enables the softening or plasticizing of the material at room temperature, and allows the resulting plastic mass to be molded very easily at room or elevated temperature with small or moderate pressure. Only a small proportion of the liquid is required. This total solvent or plasticizing action of the three-component liquid is not noted if any one of the constituents is substituted for the total liquid.

When the copolymer of monomeric ethyl alpha methacrylate, diallyl itaconate, and styrene is formed upon curing in intimate admixture with the finely divided polymeric ethyl alpha methacrylate, a denture material is formed having many of the desirable properties of the polymers of the three liquid constituents in an amount depending to some extent upon the proportions thereof used, with greater strength at mouth temperatures using the liquid combination than that made by using one of its components alone with polymeric ethyl alpha methacrylate.

It will be apparent that the three-component liquid is not merely additive or aggregative in nature, but that the constituents combine to give desirable properties that are not obtained by using any constituent alone as the liquid. For example, if styrene alone is used as the liquid, and cured in intimate admixture with the polymeric ethyl alpha methacrylate, a resulting test specimen is milky and translucent. This shows the incompatibility of the polystyrene formed with the polymeric ethyl alpha methacrylate. However, if a small percentage of diallyl itaconate is added to the styrene liquid and cured with the polymeric ethyl alpha methacrylate by the usual technique, a completely compatible material results. This specimen also shows very good resistance to hot water (125° F.) as noted by non-whitening even after several days' immersion. Some samples containing no diallyl itaconate whiten considerably in a short while.

Our denture material has very little shrinkage during processing and a denture formed thereof has practically no shrinkage during repairing. This is due to the fact that there is only a small difference between the specific gravity of the added liquid in its monomeric state and its specific gravity when polymerized. This difference in specific gravity between the monomeric and polymeric states is much less than in the case of monomeric and polymeric methyl alpha methacrylate. Thus, more accurately fitting dentures are assured.

Undercuts or dovetailed openings are not required to make a strong and suitable repair. The new denture material has exceedingly good adhesiveness to the denture to be repaired. Thus, rebasing and repairing are made easy. The denture to be repaired is invested according to the procedure for rubber, preferably with foil covering the denture. Our improved denture material containing about 1% benzoyl peroxide is then packed into the repair opening in the warm flask. The flask is closed and then heated for one and one-half hours, preferably at about 160° F. It is then cooled and the denture is removed and finished as usual.

Our modified ethyl alpha methacrylate denture has tremendous adhesiveness to porcelain teeth. There is substantially no seepage between the teeth and the denture material, thereby making a more sanitary and esthetic denture. Also, the new denture material has very good adhesiveness to certain metals, such as stainless steel and certain chromium alloys, particularly when applied to sand-blasted surfaces. Thus this material may be used advantageously to prepare metal base dentures. Teeth are not checked during denture formation because excessive pressures are not required in molding.

The cured denture has very low water "sorption," so that a denture made thereof does not retain odors or food tastes. Also, polymerization does not take place too rapidly and excessive shrinkage is eliminated, either of which might cause teeth to be cracked. The molded denture is easily finished by grinding or carving and polishing. There is no difficulty encountered with bubble or void formation in the denture as a result of excessive shrinkage.

Our denture composition may be made up into "plastic blanks," instead of being directly formed into a denture. Such plastic blanks are made by adding the liquid portion to the powdered polymer, mixing and allowing to stand for some time. A rubbery material is formed which can be pressed into a denture and cured in the usual manner. These blanks will remain plastic for several weeks.

It is entirely possible to omit the monomeric ethyl alpha methacrylate in the liquid, replacing this component with styrene, and still obtain a good denture. However, such a denture would not have all of the desirable properties of a denture made with the preferred composition.

The particles of the powdered polymeric ethyl alpha methacrylate should be smaller than 20 mesh. Particles which will not pass through a 20 mesh screen exert a weakening effect on the material.

It will be understood that our invention is not limited to the proportions of the ingredients given in the foregoing preferred composition. This preferred composition provides a very satisfactory denture, but this composition may be deviated from within limits.

Since certain changes may be made in the foregoing compositions, and different procedures and techniques may be used without departing from the scope of our invention, it is intended that all matter described hereinbefore shall be interpreted as illustrative and not in a limiting sense.

We claim as our invention:

1. A new dental material comprising the product which results from the polymerization of a mixture of monomeric ethyl alpha methacrylate, diallyl itaconate, and styrene in the presence of polymeric ethyl alpha methacrylate.

2. A new dental material comprising the product which results from the polymerization of a mixture of monomeric ethyl alpha methacrylate, diallyl itaconate, and styrene in the presence of polymeric ethyl alpha methacrylate, said ingredients being used substantially in the proportion of 16 parts by volume of finely divided polymeric ethyl alpha methacrylate, 1 part by volume of monomeric ethyl alpha methacrylate, 1 part by volume of diallyl itaconate, and 2 parts by volume of styrene.

3. A plastic blank for forming a denture made by mixing finely divided polymeric ethyl alpha methacrylate with a liquid comprising monomeric ethyl alpha methacrylate, diallyl itaconate, and styrene.

4. A plastic blank for forming a denture made by mixing about 16 parts by volume of finely divided polymeric ethyl alpha methacrylate with about 4 parts by volume of a liquid comprising 1 part by volume of monomeric ethyl alpha methacrylate, 1 part by volume of diallyl itaconate, and 2 parts by volume of styrene.

5. A new dental material comprising the product which results from the polymerization of a mixture comprising diallyl itaconate and styrene in the presence of polymeric ethyl alpha methacrylate.

ROY C. FEAGIN.
CHARLES H. PRANGE.